(No Model.) 2 Sheets—Sheet 1.

C. HEMJE & T. C. BRECHT.
MOLDS FOR MANUFACTURING STOPPERS AND BUNGS FROM PAPER PULP AND THE LIKE.

No. 279,869. Patented June 19, 1883.

Witnesses:
J. W. H. Johnson.
L. F. Keleher.

Inventors
Charles Hemje,
Theodore C. Brecht,
By T. C. Brecht
Attorney.

(No Model.) 2 Sheets—Sheet 2.
C. HEMJE & T. C. BRECHT.
MOLDS FOR MANUFACTURING STOPPERS AND BUNGS FROM PAPER PULP AND THE LIKE.
No. 279,869. Patented June 19, 1883.
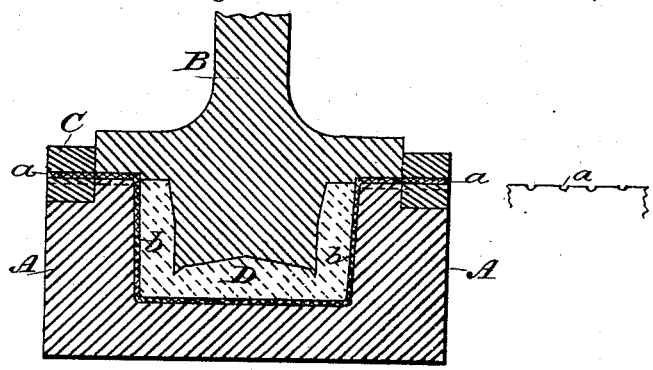
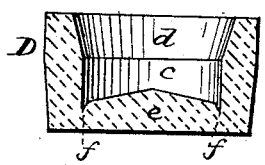
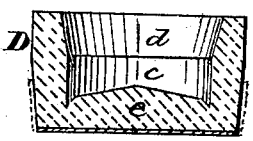
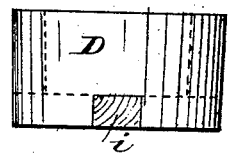
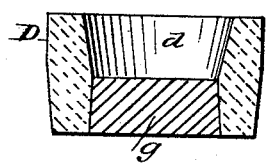
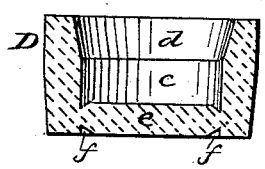
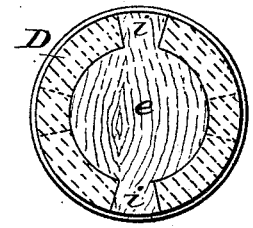
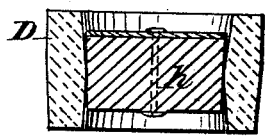
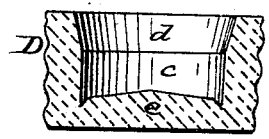
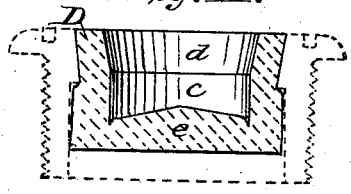
Witnesses:
J. W. H. Johnson
L. F. Keleher
Inventors
Charles Hemje,
Theodore C. Brecht,
By T. C. Brecht,
Attorney.

UNITED STATES PATENT OFFICE.

CHARLES HEMJE AND THEODORE C. BRECHT, OF WASHINGTON, D. C.

MOLD FOR MANUFACTURING STOPPERS AND BUNGS FROM PAPER-PULP AND THE LIKE.

SPECIFICATION forming part of Letters Patent No. 279,869, dated June 19, 1883

Application filed May 24, 1883. (No model.)

*To all whom it may concern:*

Be it known that we, CHARLES HEMJE and THEODORE C. BRECHT, citizens of the United States, residing at Washington, in the District of Columbia, have invented certain new and useful Improvements in Molds for Manufacturing Stoppers, &c., from Paper-Pulp and the Like; and we do hereby declare the following to be a full, clear, and exact description of the invention, such as will enable others skilled in the art to which it appertains to make and use the same.

Our invention relates to improvements in molds for the manufacture of stoppers or bungs for kegs, barrels, &c., made of papier-maché, wood pulp, artificial wood, or other similar material, as also to the stoppers or bungs as a new article of manufacture. The object is to produce a stopper or bung for kegs, barrels, &c., made of papier-maché, wood pulp, artificial wood, or other similar material that is cheap, reliable, and effective.

The invention consists in the construction and arrangement of parts, as will be more fully described hereinafter, and more particularly pointed out in the claims, reference being had to the accompanying drawings and the letters of reference marked thereon.

Figure 1:
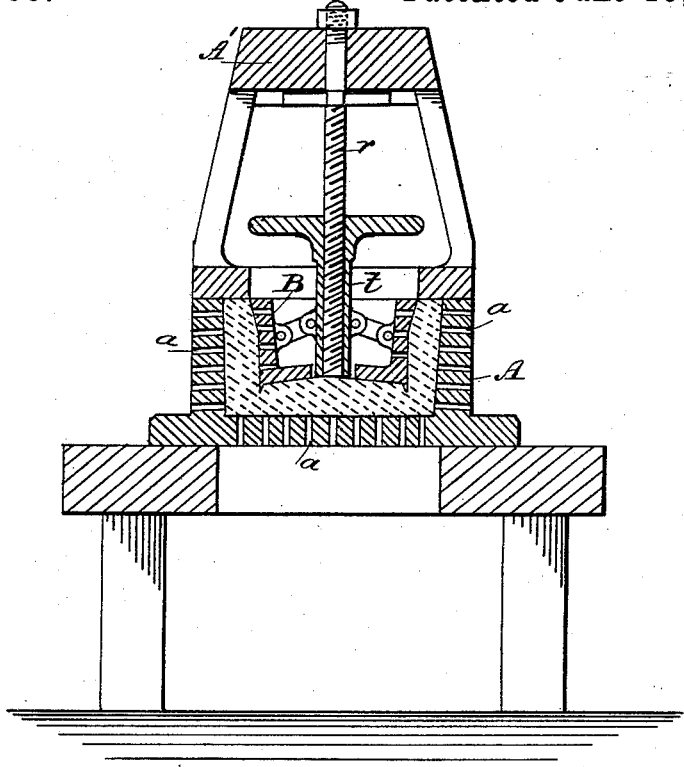
Figure 1A:
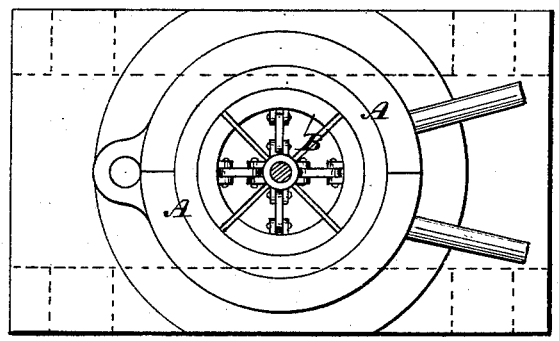

Figure 1 represents a vertical section of our mold for manufacturing the stoppers. Fig. 1ª is a top view thereof. Fig. 1ᵇ is a modification of a mold. Figs. 2 to 7, inclusive, are sections of modifications of different forms of stoppers. Fig. 8 is a side view, and Fig. 9 a bottom view, of another modification. Fig. 10 represents a bung in section. Fig. 11 is a stopper in place in the bush.

In the drawings, A is the bisected base of the mold, and B is the plunger, made in sections, and operated by a tube, $t$, having jointed links attached to it. The tube slides over a rod, $r$, secured to the top A' of the mold. The perforations permit the water to escape.

In Fig. 1ᵇ, A is the mold; B, the plunger; and C is the ring usually employed for guiding the plunger into place. In the base is arranged the usual matrix, and around the upper edge are disposed a number of holes or indentations, $a$, through which the water from the papier-maché or similar material can escape when pressure is applied to the plunger. The interior of the mold-base is lined with felt or analogous material $b$, which conveys the moisture to said holes, and also prevents the stopper from sticking to the mold, serving also to remove the stopper. The stopper D is provided with a recess, which is made partly cylindrical, as at $c$, and partly tapering, as at $d$, forming a projection, and is formed with a diaphragm or web, $e$, the annular edges of which are provided with a groove or incision, $f$, so that when the faucet is driven into the stopper said web can be easily removed and driven into the keg or barrel. The object of forming the projection is that the faucet will have its bearing on it, and at the same time to facilitate the removal of the faucet by working it about. It will be thus seen that by the faucet bearing on the projection the outer rim is prevented from being split when said faucet is driven in, as the point of pressure is opposite the point of bearing in the bushing, and also leakage around the faucet is thereby prevented.

In Fig. 4 the stopper is also made of a cylindrical ring, made tapering both ways, and an auxiliary stopper made of wood, rubber, or other material is inserted from the outside. If made of rubber or other similar material, a metal plate, $h'$, must be used, against which the faucet is placed when it is desired to drive it into the keg or barrel.

In Fig. 5 the recess is made of similar shape to that shown in Fig. 2, and the diaphragm is provided with the usual incision, while the side which would come in contact with the contents of the barrel or keg is coated with pitch, resin, or other suitable material.

In Fig. 6 the recess is made of similar shape to that shown in Fig. 2, and the diaphragm is made with an incision from both sides. In Fig. 7 the recess is made of similar shape to that shown in Fig. 2, and the outside of the stopper is made corrugated, so that it will fit and bear more snugly into the bushing.

In Figs. 8 and 9 the stopper is made of a ring, and the diaphragm $e$ is made of wood, provided with two or more dovetailed projections, $i$, which fit into correspondingly-shaped recesses in said ring.

In Fig. 10 is shown a bung, E, having the recess and diaphragm $e$ for insertion of the vent. To save material, one or both sides of the bung are provided with annular recesses $k$.

In Fig. 11 is shown a stopper in position in a bushing, (shown in dotted lines,) having a sharp right-angular projection, which prevents the stopper being forced out of the bushing by the pressure of the gas or fluid in the keg or barrel. They may be made of wood having a similar-shaped recess, if desired.

Having thus described our invention, what we claim, and desire to secure by Letters Patent, is—

1. A mold for the manufacture of artificial stoppers or bungs, consisting of a base, A, having holes $a$, plunger B, ring C, and felt lining $b$, all substantially as specified.

2. An artificial stopper or bung provided with a cylindrical part, $c$, and tapering part $d$, and a web, $e$, substantially as and for the purpose specified.

3. A stopper or bung provided with a recess formed of a cylindrical part, $c$, and tapering part $d$, and having a web, $e$, provided with an incision, substantially as set forth.

4. A stopper or bung consisting of a ring provided with an opening tapering from both sides, in combination with an auxiliary stopper, substantially as specified.

5. A mold for manufacturing artificial stoppers or bungs, consisting of a bisected mold provided with perforations, and a sectional plunger, arranged for operation substantially as set forth.

In testimony whereof we affix our signatures in presence of two witnesses.

CHARLES HEMJE.
THEODORE C. BRECHT.

Witnesses:
JOHN A. BASSETT,
J. W. HAMILTON JOHNSON.